United States Patent [19]

Suganuma

[11] Patent Number: 5,508,579

[45] Date of Patent: Apr. 16, 1996

[54] ULTRASONIC MOTOR DRIVING DEVICE

[75] Inventor: Ryoichi Suganuma, Yokohama, Japan

[73] Assignee: Nikon Corporation, Tokyo, Japan

[21] Appl. No.: 203,510

[22] Filed: Feb. 28, 1994

Related U.S. Application Data

[63] Continuation of Ser. No. 795,385, Nov. 21, 1991, abandoned.

[30] Foreign Application Priority Data

Nov. 29, 1990 [JP] Japan ..................... 2-332136

[51] Int. Cl.$^6$ ..................................................... H02N 2/00
[52] U.S. Cl. ............................................................. 310/316
[58] Field of Search ............................ 310/316; 318/116

[56] References Cited

U.S. PATENT DOCUMENTS

| | | | |
|---|---|---|---|
| 3,573,781 | 4/1971 | Sholn ........................... | 340/248 |
| 3,975,650 | 8/1976 | Payne ........................... | 318/116 |
| 4,275,363 | 6/1981 | Mishiro et al. ............... | 310/316 |
| 4,713,571 | 12/1987 | Suzuki et al. ............... | 310/316 |
| 4,749,896 | 6/1988 | Suzuki et al. ............... | 310/316 |
| 4,794,294 | 12/1988 | Shimizu et al. ............. | 310/316 |
| 4,879,528 | 11/1989 | Gotamda ..................... | 310/316 |
| 4,914,337 | 4/1990 | Takagi ......................... | 310/316 |
| 4,954,741 | 9/1990 | Furutsu et al. .............. | 310/316 |
| 4,954,742 | 9/1990 | Izukawa ....................... | 310/316 |
| 4,965,532 | 10/1990 | Sakurai ........................ | 310/316 |
| 4,998,048 | 3/1991 | Furutsu ....................... | 318/116 |
| 5,001,442 | 3/1991 | Hanaie et al. ............... | 310/316 |
| 5,013,982 | 5/1991 | Sasaki ........................... | 318/116 |
| 5,061,882 | 10/1991 | Takage ........................ | 310/316 |
| 5,134,348 | 7/1992 | Izukawa ....................... | 318/116 |
| 5,159,223 | 10/1992 | Suganuma ................... | 310/316 |
| 5,173,631 | 12/1992 | Suganuma ................... | 310/316 |

FOREIGN PATENT DOCUMENTS

| | | | |
|---|---|---|---|
| 0039870 | 2/1986 | Japan ........................... | 310/316 |
| 61-251490 | 11/1986 | Japan ........................... | H02N 2/00 |

*Primary Examiner*—Thomas M. Dougherty
*Attorney, Agent, or Firm*—Shapiro and Shapiro

[57] ABSTRACT

An ultrasonic motor driving device comprises: a detecting unit for detecting a phase difference between a high-frequency drive voltage waveform applied to a drive electrode of an ultrasonic motor and a voltage waveform outputted by a monitor electrode generating frequency voltage in accordance with the vibrations of an elastic member of the ultrasonic motor; a setting unit for setting a reference phase difference in accordance with a drive frequency within a normally used range including a frequency which provides the greatest drive force for the ultrasonic motor; a control unit which performs control such that the phase difference becomes equal to the reference phase difference; a frequency signal generating unit which generates a signal having a frequency in accordance with an output of the control unit and which applies the signal to the ultrasonic motor; and a lower and/or upper limit frequency control unit for controlling the frequency signal generating unit so that when the drive frequency is lower and/or higher than the normally used range, the drive frequency will be maintained higher and/or lower than a frequency which provides a phase difference equal to the reference phase difference, respectively.

20 Claims, 6 Drawing Sheets

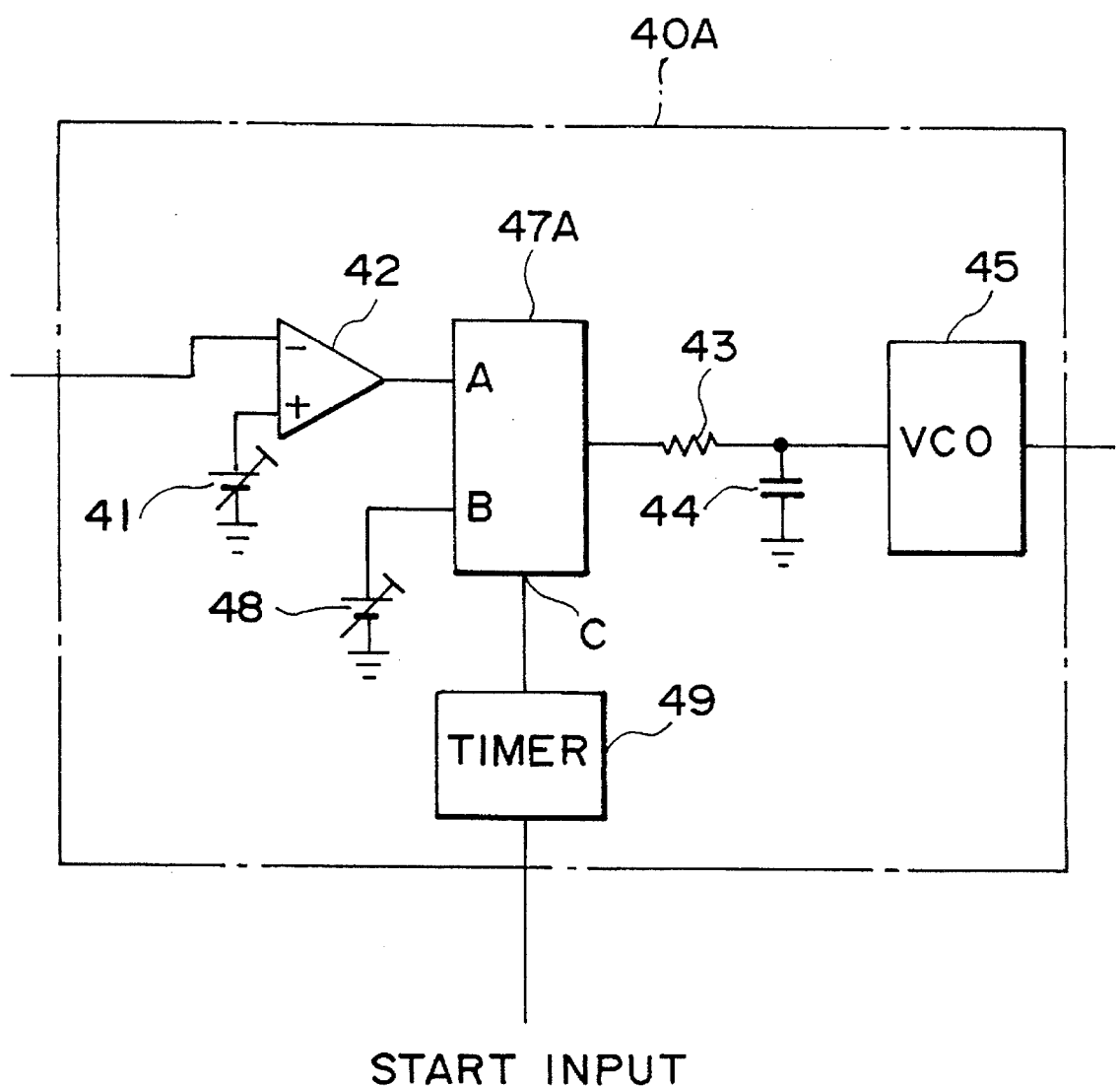
START INPUT
F I G. 3

ULTRASONIC MOTOR DRIVING DEVICE

This is a continuation of application Ser. No. 795,385 filed Nov. 21, 1991, now abandoned.

BACKGROUND OF THE INVENTION

1. Field of the Invention

The present invention relates to an ultrasonic motor driving device which controls the drive frequency for the ultrasonic motor in accordance with phase difference between drive voltage and monitor voltage.

2. Related Background Art

There have been known ultrasonic motor driving devices which control drive frequencies based on phase differences between waveforms of drive voltage applied to a motor drive electrode and waveform of monitor voltage generated at a motor monitor electrode which generates frequency voltage in accordance with vibrations of an elastic member of the motor. The contol is such as to achieve a predetermined phase difference which provides stable operation of the motor. See, for example, Japanenes Patent Laid-Open No. 61-251490.

Such a conventional driving device will be described with reference to FIG. 4.

Drive voltage applied to a drive electrode 100a of an ultrasonic motor 100 is fed back to a waveform shaper 1, by which it is converted to square-wave voltage of a predetermined level. On the other hand, monitor voltage generated at a monitor electrode 100c is fed back to another waveform shaper 2, by which it is converted to square-wave voltage of a predetermined level. These square-wave voltages are inputted to a phase difference detector 3 illustrated in detail in FIG. 5.

As shown in FIG. 5, the phase difference detector 3 is composed of AND gates 31, 32, an SR flip flop circuit 33, a buffer 34, a resistor 35 and a capacitor 36. The above-mentioned square-wave drive voltage is sent to one of two input terminals of one of the AND gates 31. The square-wave monitor voltage is sent to one of two terminals of the other AND gate 32. Then, an output terminal Q of the flip flop circuit 33 outputs pulse voltage having a pulse width in accordance with a phase difference between the square-wave voltages inputted to the AND gates 31 and 32, i.e. a phase difference $\Phi$ between the drive voltage and the monitor voltage. The pulse voltage is converted to a voltage level in accordance with a phase difference $\Phi$, as shown in FIG. 6, by an integration circuit composed of the buffer 34, the resistor 35 and the capacitor 36.

An output of the phase difference detector 3 is sent to a terminal (−) of an error amplifier 42 in a drive frequency setting unit 4. Another terminal (+) of the error amplifier 42 receives a voltage in accordance with a reference phase difference $\Phi K$ set by a reference phase difference setter 41. The error amplifier 42 compares the phase difference $\Phi$ from the phase difference detector 3 with the reference phase difference $\Phi K$, and then amplifies a voltage in accordance with a difference between the phase differences ($\Phi K-\Phi$). The voltage is sent to a loop filter circuit composed of a resistor 43 and a capacitor 44, and then to a voltage controlling oscillator 45 (referred to as a "VCO" hereinafter). The VCO 45 generates a frequency signal having a frequency in accordance with an inputted voltage level and then sends it to a phase shifter 5.

The phase shifter 5 converts the frequency signal to a pair of frequency signals having a phase difference of $\pi/2$ therebetween and outputs them to a power amplifier 6. When a start input signal is at Hi-level, the power amplifier 6 amplifies the power of these frequency signals and applies the amplified signals to the drive electrodes 100a and another drive electrode 100b of the ultrasonic motor 100.

Thus, the conventional driving device performs a feedback control by which the phase difference $\Phi$ between a monitor voltage and a drive voltage of a current drive state become equal to the reference phase difference $\Phi K$ so that drive frequency of the ultrasonic motor 100 becomes equal to a frequency FK corresponding to the reference phase difference $\Phi K$.

FIG. 7 shows variations of a drive speed N and phase difference $\Phi$ with relation to a drive frequency F of an ultrasonic motor. In the figure, a frequency range FD is the range of drive frequency usually used for ultrasonic motors. A frequency FR is the resonance frequency which causes the largest vibrations of the elastic member of the ultrasonic motor. It is known that drive frequencies very close to the resonance frequency FR cause the ultrasonic motor to operate unstably. There are other frequencies with which the elastic member resonates; one frequency is lower than and another is higher than the resonance frequency FR, as shown in FIG. 7. Although ultrasonic motors can be driven by frequencies in ranges slightly higher than these other resonance frequencies, such frequency ranges are usually not used because if they are used, the motor operates unstably and rotates in a reversed direction.

While the above-described conventional device controls the drive frequency so that a phase difference $\Phi$ becomes equal to the reference phase difference $\Phi K$, if a current drive frequency is slightly lower than the drive frequency FK, i.e. a current phase difference $\Phi$ is smaller than the reference phase difference $\Phi K$ ($\Phi K-\Phi>0$), the error amplifier 42 accordingly increases its output voltage and thus the capacitor 44 is charged. As the terminal voltage of the capacitor 44 increases, the frequency of a frequency signal from the VCO 45 increases. When the frequency of the drive voltage applied to the ultrasonic motor 100 reaches the drive frequency FK, i.e. a current phase difference $\Phi=$ the reference phase difference $\Phi K$, the error amplifier 42 stops charging the capacitor 44. Thus, the capacitor 44 maintains its terminal voltage at such a level that the frequency outputted by the VCO 45 is equal to the drive frequency FK. In this way, the ultrasonic motor 100 is driven by the frequency FK.

If a current drive frequency is slightly higher than the frequency FK, i.e. a phase difference $\Phi>\Phi K$, the error amplifier 42 accordingly reduces its output, so that the capacitor 44 discharges to reduce its terminal voltage. In this manner, frequency outputted by the VCO 45 decreases to the frequency FK, which makes a phase difference $\Phi$ equal to the reference phase difference $\Phi K$. Thus, the ultrasonic motor 100 is driven by the drive frequency FK.

While an ultrasonic motor is being operated, a detected phase difference $\Phi$ sometimes varies because of a sudden load change, noise interference in a controlling circuit, particularly in a monitor voltage waveform shaper, etc. Also, when an ultrasonic motor is started, the ultrasonic motor operates unstably for a moment, so that the detected phase difference $\Phi$ varies.

In a conventional driving device as described above, an output of an error amplifier substantially changes and thus a frequency outputted by the VCO substantially changes as the phase difference $\Phi$ varies during operation or start-up of an ultrasonic motor. As a result, a feedback control system converges a drive frequency to a frequency which is outside the usual drive frequency range FD but which provides a phase difference equal to the reference phase difference ΦK, so the ultrasonic motor operates unstably. As shown in FIG. 7, since phase difference Φ goes up and down as the drive frequency F is continuously varied, the motor operation driven by frequencies other than the drive frequency FK, such as FL2, FL1, FH1 and FH2, provide a phase difference equal to the reference phase difference ΦK.

If output frequency of the VCO 45 substantially decreases, with a change in phase difference Φ, to a level lower than the frequency FL1, the error amplifier 42 operates to decrease, not increase, the output frequency of the VCO 45 since a current phase difference Φ is greater than the reference phase difference ΦK (ΦK−Φ<0), as described above. Thus, a current drive frequency F further decreases until it reaches the frequency FL2, which provides a phase difference Φ= the reference phase difference ΦK. In this manner, the frequency control converges to the frequency FL2. Driven by the frequency FL2, the ultrasonic motor 100 operates unstably, as described above.

On the contrary, if the output frequency of the VCO 45 substantially increases, with a change in phase difference Φ, to a level higher than the frequency FH1, the error amplifier 42 operates to increase, not decrease, the output frequency of the VCO 45 since a current phase difference Φ is smaller than the reference phase difference ΦK (ΦK−Φ>0). Thus, a current drive frequency F further increases to reach the frequency FH2, which provides a phase difference Φ= the reference phase difference ΦK. In this manner, the frequency control converges to the frequency FH2. Driven by the frequency FH2, the ultrasonic motor 100 operates unstably, as described above.

There can be considered methods to avoid such a disadvantage of the conventional devices, e.g. reducing the amplification ratio of the error amplifier 42 so that changes in the frequency outputted by the VCO 45 will be suppressed, or increasing the time constant of the loop filter composed of the resistor 43 and the capacitor 44 so that the responsiveness of the feedback control system will be reduced. However, such methods can not be employed since control precision and control responsiveness decrease if any of such methods are used.

SUMMARY OF THE INVENTION

It is an objective of the present invention to provide an ultrasonic motor driving which, in order to stably drive an ultrasonic motor, restricts the frequencies outputted by a VCO, for example, so that (a) the drive frequency will be substantially maintained higher than a frequency which is below a normal running range and which provides the same phase difference as a frequency in the normal running range, and/or (b) the drive frequency will be substantially maintained lower than another frequency which is above the normal running range and which provides the same phase difference as a frequency in the normal running range.

With reference to FIG. 1, the present invention is applied to an ultrasonic motor driving device according comprising: a phase difference detecting means 3 for detecting a phase difference between a high-frequency drive voltage waveform applied to a drive electrode of an ultrasonic motor and a voltage waveform outputted by a monitor electrode generating frequency voltage in accordance with the vibrations of an elastic member of the ultrasonic motor, the phase difference having a vibration characteristic which changes as the drive frequency for driving the ultrasonic motor is changed; a reference phase difference setting means 41 for setting a reference phase difference in accordance with a drive frequency within a normally used drive frequency range including a frequency which provides the greatest drive force for the ultrasonic motor; a control means 42 which performs control such that the phase difference detected by the phase difference detector becomes equal to the reference phase difference set by the reference phase difference setting means; and a frequency signal generating means 45 which generates a signal having a frequency in accordance with an output of the control means and which applies the signal to the ultrasonic motor.

One aspect of the present invention provides an ultrasonic motor driving device as described above further comprising a lower limit frequency control means 46, 47 for controlling the frequency signal generating means 45 so that when the drive frequency is shifted to a level lower than the normally used drive frequency range, the drive frequency will be substantially maintained higher than a frequency which is lower than the normally used range and which provides a phase difference equal to the reference phase difference set by the reference phase difference setting means 41.

Another aspect of the present invention provides an ultrasonic motor driving device as described above further comprising an upper limit frequency control means 46, 47 for controlling the frequency signal generating means 45 so that when the drive frequency is shifted to a level higher than the normally used drive frequency range, the drive frequency will be substantially maintained lower than a frequency which is above the normally used range and which provides a phase difference equal to the reference phase difference.

Still another aspect of the present invention provides an ultrasonic motor driving device as described above further comprising both the lower limit frequency control means and the upper limit frequency control means for controlling the frequency signal generating means 45 so that the drive frequency will be maintained higher than lower limit frequency and lower than the upper limit frequency. The upper and lower limit frequencies refer to the above-described frequencies which provide a phase difference equal to the reference phase difference. Thus, the ultrasonic motor is driven by frequencies in a range which is set as described above.

In the above description of the present invention, each of the means is referred to by a numeral which denotes the corresponding element in the embodiments described below. However, the present invention is not limited to the illustrative forms herein, as will be readily appreciated by those skilled in the art.

BRIEF DESCRIPTION OF THE DRAWINGS

FIG. 3 is a block diagram of a drive frequency setting means of a driving device which is a modification of the driving device shown in FIG. 2;

DESCRIPTION OF THE PREFERRED EMBODIMENTS

Figure 1:
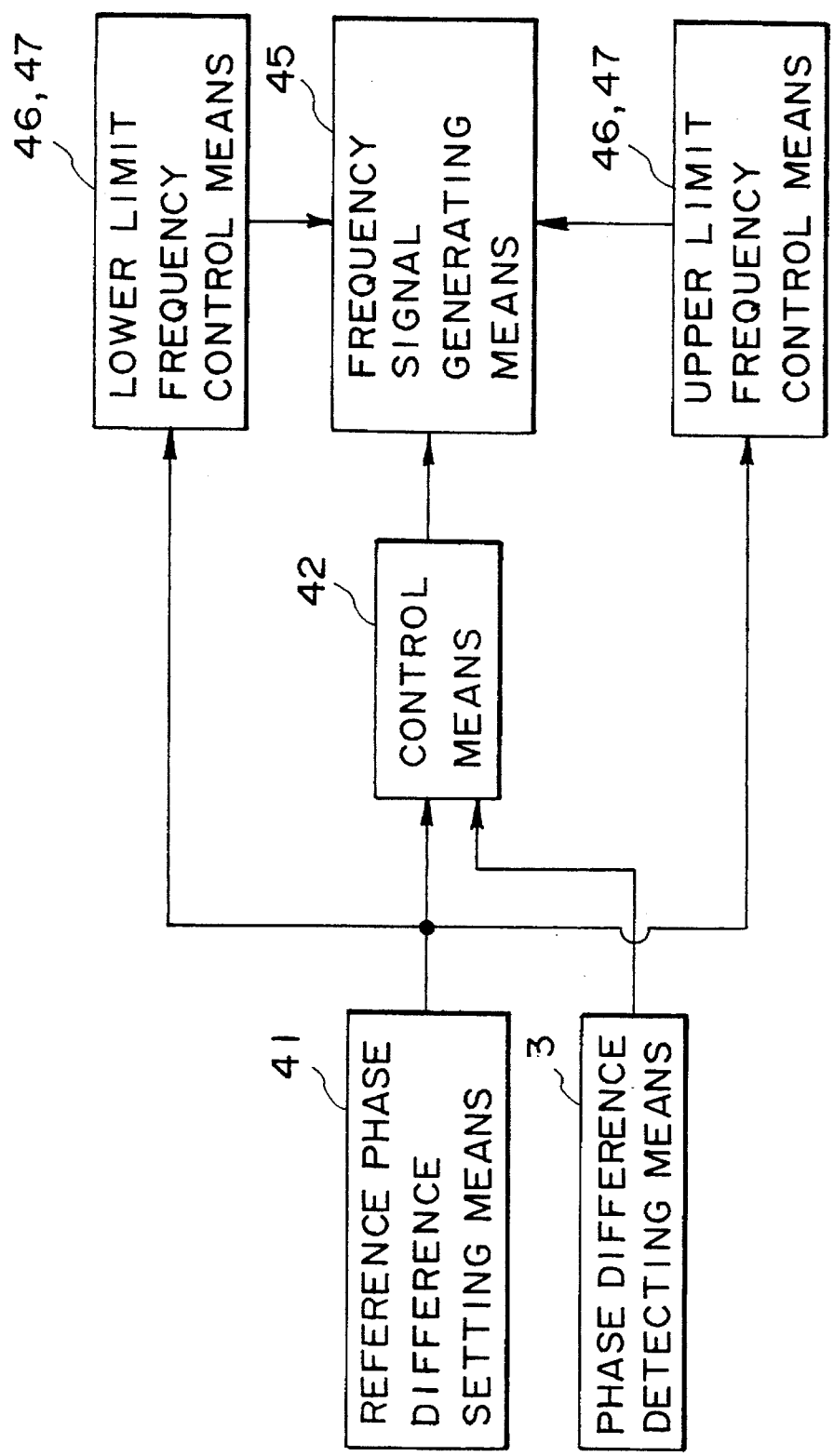
FIG. 1 is a basic block diagram of a driving device of the present invention.
Figure 2:
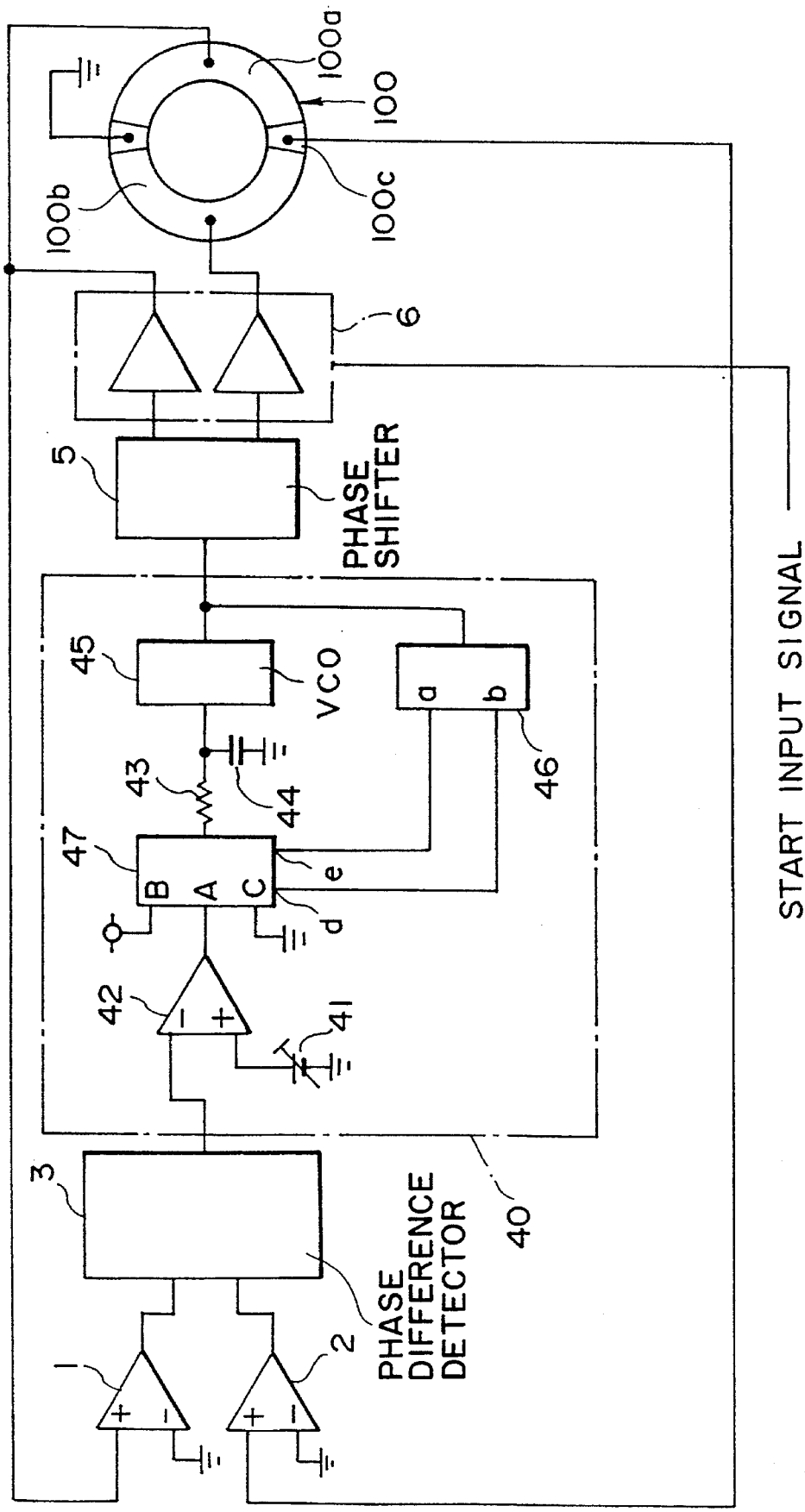
FIG. 2 is a more detailed block diagram showing a driving device according to one embodiment of the present invention.
Figure 4:
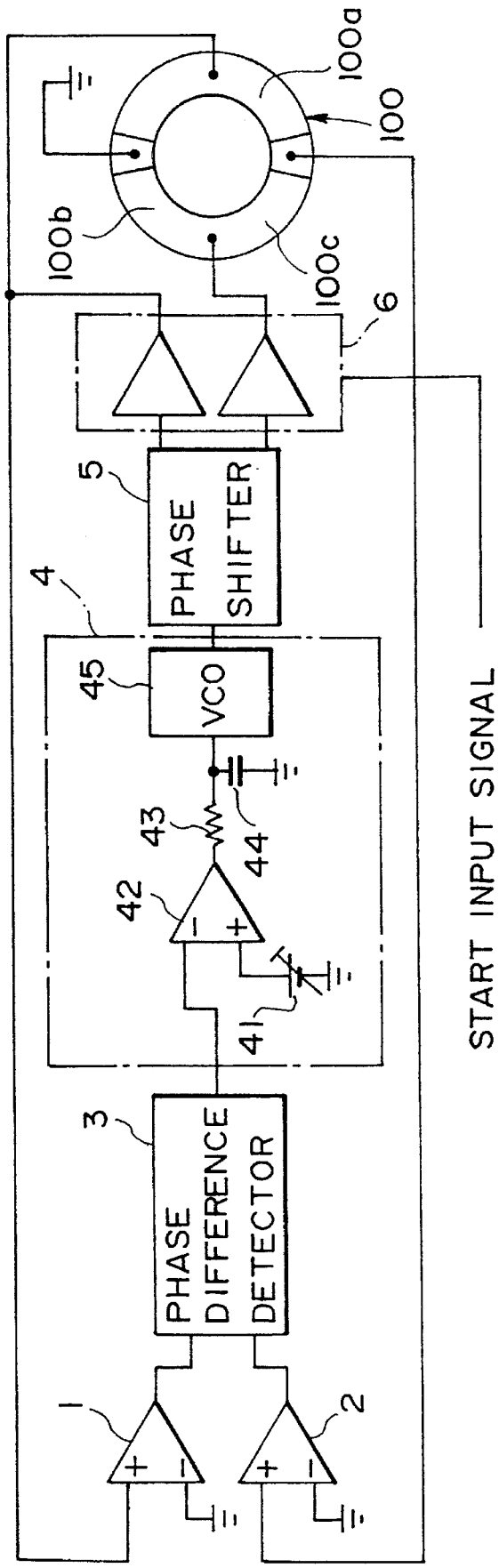
FIG. 4 is a block diagram of a conventional driving device.
Figure 5:
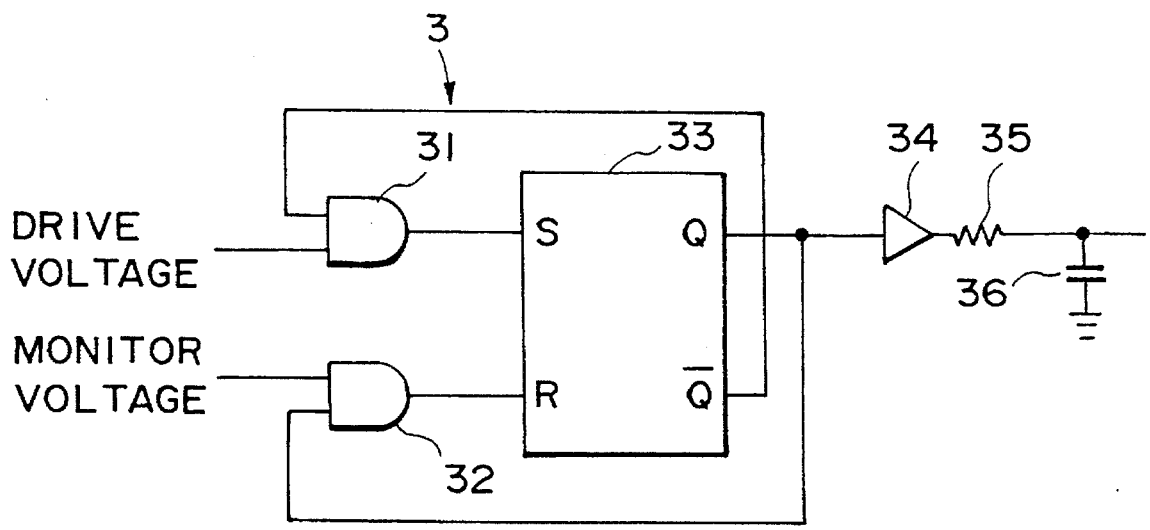
FIG. 5 is a detailed block diagram of a phase difference detector.

One embodiment of the present invention will be described with reference to FIG. 2. In the figure, units and parts equivalent to those in the conventional art shown in FIG. 4 are denoted by the same numerals as those used in FIG. 4.

A drive frequency setting unit 40 comprises a frequency discriminator 46 and a multiplexer 47, as well as a reference phase difference setter 41, an error amplifier 42, a resistor 43, a capacitor 44 and a VCO 45.

Figure 7:
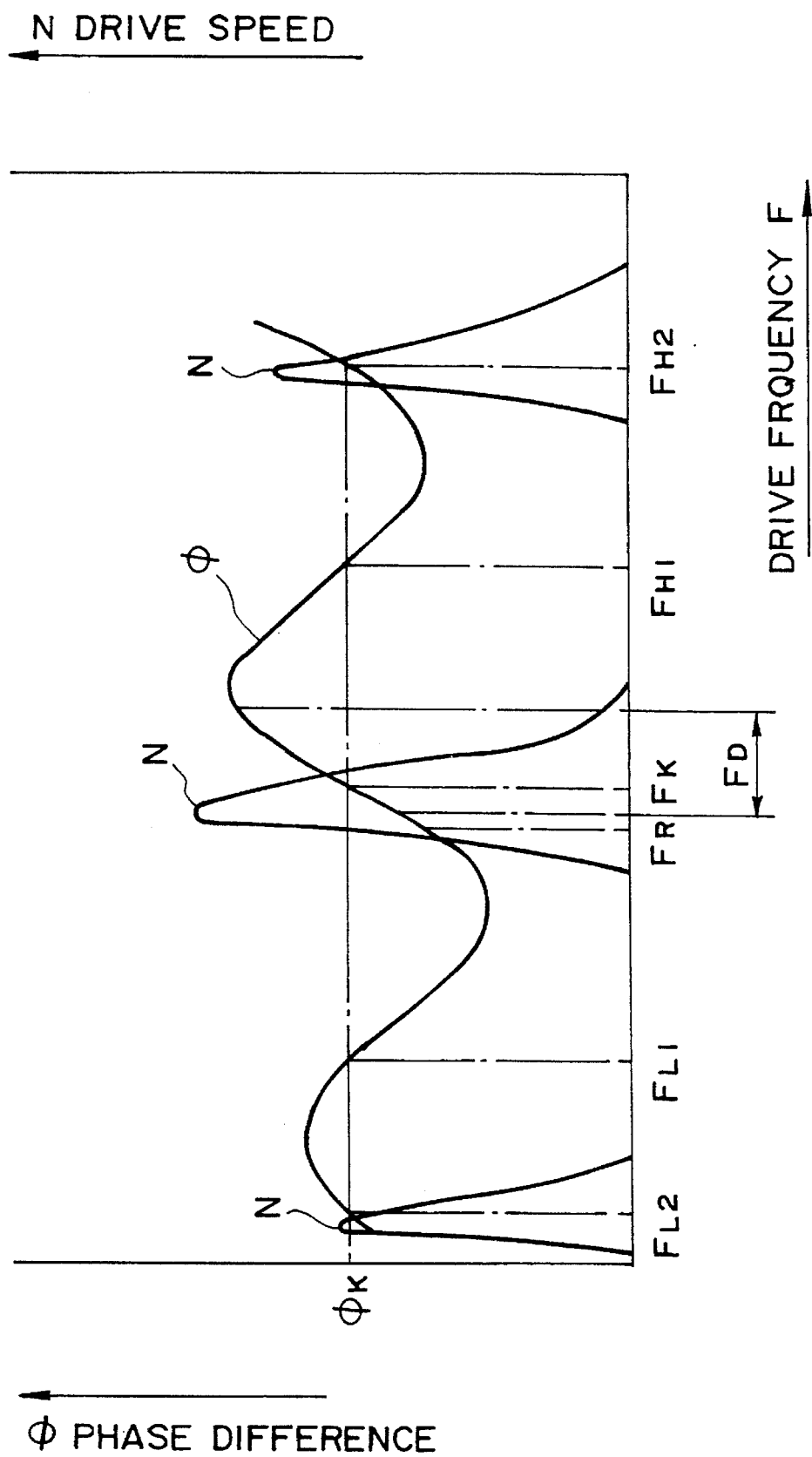
FIG. 7 is a graph exhibiting the characteristics of drive speed and phase difference versus drive frequency.

The frequency discriminator 46 discriminates frequencies outputted by the VCO 45. When an output frequency of the VCO 45 is higher than the frequency FL1 indicated in FIG. 7, a terminal a of the frequency discriminator 46 becomes Hi-level, and when it is lower, the terminal a becomes Lo-level. When an output frequency of the VCO is lower than the frequency FH1 indicated in FIG. 7, another terminal b thereof becomes Hi-level, and when it is higher, the terminal b becomes Lo-level.

The multiplexer 47 is provided between the error amplifier 42 and the resistor 43. The multiplexer 47 has an input terminal A connected to the output terminal of the error amplifier 42, an input terminal B connected to a power source and, an input terminal C which is grounded. The multiplexer 47 selects one of these input terminals A, B, C according to the levels of the output terminals a and b of the frequency discriminator 46. When both output terminals a and b of the frequency discriminator 46 are Hi-level, i.e., when a drive frequency F for an ultrasonic motor 100 is in a range of FL1<F<FH1, the input A is selected. When the output a is Lo-level and the output b is Hi-level, i.e. when a drive frequency F is lower than the frequency FL1, the input B is selected. When the output a is Hi-level and the output b is Lo-level, i.e. when a drive frequency F is higher than the frequency FH1, the input C is selected.

Operation of the above-described driving device will be explained.

Figure 6:
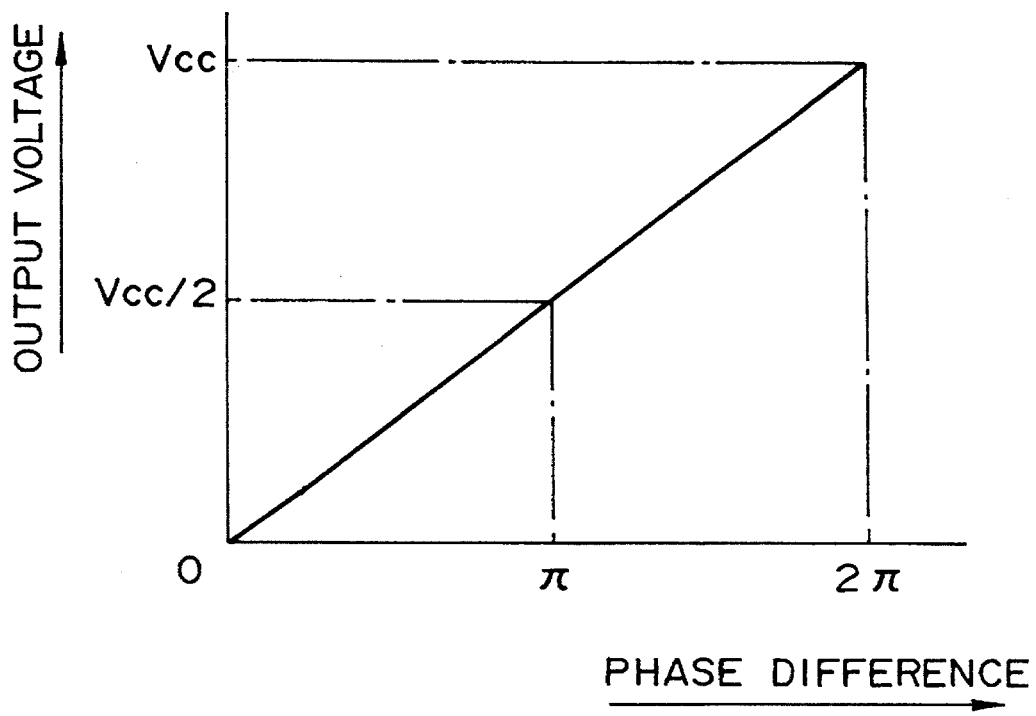
FIG. 6 is a graph showing the input-output characteristics of a phase difference detector.

When an output frequency of the VCO 45 is in the range of FL1<F<FH1, both of the outputs a and b of the frequency discriminator 46 become Hi-level, and the multiplexer 47 selects the input A connected to the error amplifier 42. Thus, the VCO 45 outputs a frequency F in accordance with an output voltage of the error amplifier 42 as shown in FIG. 6, and then is shifted and amplified by a phase shifter 5 and a power amplifier 6 to become a drive voltage which is applied to the ultrasonic motor 100.

If a current phase difference Φ detected by a phase detector 3 becomes smaller than the reference phase difference ΦK because of a sudden load change, a noise interference in a control circuit or the like during start-up or operation of the ultrasonic motor 100, the error amplifier 42 increases its output voltage, as described above. Since the input A is selected by the multiplexer 47 in such a case, the output of the error amplifier 42 goes through the multiplexer 47 and the resistor 43 and then charges the capacitor 44. As a result, input voltage to the VCO 45 increases, and thus an output frequency thereof increases. When an output frequency of the VCO 45 becomes higher than the frequency FH1, the output b of the frequency discriminator 46 turns to Lo-level, and thus the multiplexer 47 selects the input C. Through the connection line of the resistor 43 and the input C of the multiplexer 47, one of the terminals of the capacitor 44 is grounded, and thus the voltage thereof is discharged. As the terminal voltage of the capacitor 44 decreases, the VCO 45 decreases its output frequency F. When an output frequency F of the VCO 45 becomes lower than the frequency FH1, the output b of the frequency discriminator 46 turns back to Hi-level, and thus the multiplexer 47 selects the input A.

If a current phase difference Φ becomes greater than the reference phase difference ΦK because of any of the causes mentioned above, the error amplifier 42 decreases its output voltage. As a result, voltage stored by the capacitor 44 is discharged through the connection line of the resistor 43, the input A of the multiplexer 47 and the error amplifier 42. Then, with a decrease of the terminal voltage of the capacitor 44, the VCO 45 decreases its output frequency F. When an output frequency F of the VCO 45 becomes lower than the frequency FL1, the multiplexer 47 selects the input B. Through the connection line of the power source, the input B and the resistor 43, the capacitor 44 is charged, and thus the terminal voltage thereof increases. With an increase of the terminal voltage, the VCO 45 increases its output frequency F. When an output frequency F of the VCO 45 becomes higher than the frequency FL1, the output a of the frequency discriminator 46 turns to Hi-level, and thus the multiplexer 47 selects the input A.

As described above, when the frequency discriminator 46 detects an output frequency F of the VCO 45 exceeding the frequency FH1, the multiplexer selects the grounded input C, through which the terminal voltage of the capacitor 44 is discharged, whereby the output frequency F of the VCO 45 is controlled so that the upper limit thereof will be the frequency FH1. When an output frequency F is found to be lower than the frequency FL1, the multiplexer selects the source-connected input B, through which the capacitor 44 is charged, whereby the output frequency F of the VCO 45 is controlled so that the lower limit thereof will be the frequency FL1. Thus, an output frequency of the VCO 45 is restricted within the range of the frequency FL1 to FH1. Even if a current phase difference Φ changes during operation, there is no danger that the ultrasonic motor 100 will be driven by a frequency which is outside the normal drive frequency range FD but which provides a phase difference Φ equal to the reference phase difference ΦK. Therefore, this driving device can stably drive the ultrasonic motor 100 with high controlling precision and responsiveness.

Although, according to this embodiment, the frequency discriminator 46 and the multiplexer 47 are used to restrict an output frequency of the VCO 45 within a predetermined range, a VCO in which its output frequency can be set within the above-mentioned range of FL1<F<FH1 may instead be used.

Though both the upper and lower limits are employed to control an output frequency of the VCO 45 according to this embodiment, only an upper or lower limit may be employed for the control if conditions allow.

If there is no need to consider a change of phase difference Φ because of a sudden load change, a noise interference in a control circuit or the like occurring during operation as described above, a driving device using a modified drive frequency setting unit 40A, as shown in FIG. 3, which responds only to a change of phase difference Φ occurring during start-up, is possible.

With reference to FIG. 3, the drive frequency setting unit 40A for starting the ultrasonic motor 100 by a start-up frequency FS will be described. In the figure, parts and elements equivalent to those in FIGS. 2, 4 are denoted by the same numerals as those used therein.

A multiplexer 47A is provided between an error amplifier 42 and a resistor 43. The multiplexer 47A has an input terminal A connected to an output of the error amplifier 42, an input terminal B connected to a start frequency setter 48 which sets a start frequency FS, and a control terminal C connected to the output of a timer 49. The multiplexer 47A selects the input A when the control terminal C is Hi-level, and it selects the input B when the control terminal C is Lo-level. The multiplexer 47A, the start-up frequency setter 48 and the timer 49 constitute a time-delay setting means.

The timer 49 delays the shift from Lo-level to Hi-level in its output by a set period t1. Thus, after the start input shifts from Lo-level to Hi-level during start-up, the multiplexer 47A keeps the input B for a set period t1 and then changes the selection to the input A.

The operation of this drive frequency setting unit 40A will now be explained.

When the start input to the timer 49 shifts from Lo-level to Hi-level during the start-up, the timer 49 keeps its output at Lo-level for a set period. Therefore, for that period, the multiplexer 47A maintains the input B as voltage level set by the start frequency setter 48 through the multiplexer 47A and the resistor 43. The VCO 45 outputs a frequency signal to the phase shifter 5 at a frequency FS, and thus the ultrasonic motor 100 is started by a drive frequency FS.

After the set period t1, the timer 49 shifts its output to Hi-level, and thus the multiplexer 47A selects the input A. Through the multiplexer 47A and the resistor 43, output of the error amplifier 42 is applied to the capacitor 44. Thus, the drive frequency Φ is controlled according to a difference (ΦK−Φ) between the reference phase difference ΦK and a current phase difference Φ.

In short, the ultrasonic motor 100 is started by the start frequency FS set by the start frequency setter 48, and after the start-up, the drive frequency is controlled according to the phase difference Φ between the drive voltage and the monitor voltage. Therefore, the ultrasonic motor 100 can be stably started without being affected by a change in phase difference Φ caused by unstable movement of the ultrasonic motor 100 occurring during start-up.

Results of an experiment performed by the inventor show that the movement of the ultrasonic motor becomes stable 1 to 2 msec after it is started. Therefore, a sufficient delay period t1 to be set in the timer 49 will be longer than 2 msec. If a more precise setting is necessary, an ultrasonic motor to be used must be tested to provide data by which the set period t1 can be determined. As an alternative, an external control circuit may be employed which provides signals equivalent to the output of the timer 49 and which varies the set period.

In the case where the start frequency FS is set to a frequency lower than the resonance frequency FR of the ultrasonic motor 100, the start frequency passes the resonance frequency and a frequency range adjacent thereto in which the ultrasonic motor 100 operates unstably while the start frequency is increased into the usual drive frequency range FD. However, results of an experiment performed by the inventor show that if the start frequency passes the resonance frequency range within several milliseconds (the length of such a period differs depending on the type of ultrasonic motor), ultrasonic motors can be stably started without problems such as producing abnormal noises. This is because there is a time-lag between the frequency shift into the resonance frequency range and the ultrasonic motor responding the frequency shift so as to operate unstably. The unstable operation of the ultrasonic motor can be avoided if the time constant determined by the resistor 43 and the capacitor 44 is set so that the usual drive frequency range FD is reached within the time-lag. Unstable motor operation due to other causes such as a sudden load change during operation can be avoided in the same manner. Such a method is used in other types of ultrasonic motor driving device comprising a drive frequency control means which controls drive frequency for driving the ultrasonic motor, and will provide an effect similar to that in this embodiment. Therefore, there is no problem if the start frequency FS is set in a range of FL1<FS<FH1.

According to this embodiment: the phase difference detector 3 a phase difference detector means; the reference phase difference setter 41 constitutes a reference phase difference setting means; the error amplifier 41 constitutes a control means; the VCO 45 constitutes a frequency signal generating means; and the frequency discriminator 46 and the multiplexer 47 constitutes a lower limit frequency control means and an upper limit frequency control means.

According to the present invention, either the lower limit frequency, the upper limit frequency, or both the lower and upper limit frequencies of an output frequency range of a VCO are controlled so that the output frequency range will stay within a frequency range usually used for driving an ultrasonic motor. Therefore, even though the phase difference changes during the start-up and the operation of an ultrasonic motor, the drive frequency is maintained approximately in a normally used frequency range and thus never diverts excessively therefrom. Also, high precision and responsiveness are secured in the control of the current phase difference according to the reference phase difference. Thus, a driving device according to the present invention can stably drive an ultrasonic motor.

What is claimed is:

1. An ultrasonic motor driving device comprising:

phase difference detecting means for detecting a phase difference between a voltage waveform of a drive frequency applied to a drive electrode of an ultrasonic motor and a voltage waveform indicative of a vibration state of an elastic member of the ultrasonic motor;

reference phase difference setting means for setting a reference phase difference corresponding to an optimum drive frequency within a normal running range and which makes a drive force of the ultrasonic motor largest;

difference outputting means connected to said phase difference detecting means and said reference phase difference setting means for outputting a signal corresponding to a difference between a phase difference detected by said phase difference detecting means and the reference phase difference set by said reference phase difference setting means;

frequency signal generating means connected to said difference outputting means for generating a drive frequency to be applied to the drive electrode of the ultrasonic motor, based on the signal output by said difference outputting means; and lower limit frequency control means connected to said frequency signal generating means for controlling the drive frequency generated by said frequency signal generating means so as to substantially maintain the drive frequency above a predetermined lower limit frequency which would produce a detected phase difference equal to that for a drive frequency in said normal running range.

2. A driving device according to claim 1, wherein said normal running range is slightly above a resonance frequency of the ultrasonic motor and said predetermined lower limit frequency is substantially above another resonance frequency of the ultrasonic motor.

3. An ultrasonic motor driving device comprising:

phase difference detecting means for detecting a phase difference between a voltage waveform of a drive frequency applied to a drive electrode of an ultrasonic motor and a voltage waveform indicative of a vibration state of an elastic member of the ultrasonic motor;

reference phase difference setting means for setting a reference phase difference corresponding to an optimum drive frequency within a normal running range and which makes a drive force of the ultrasonic motor largest;

difference outputting means connected to said phase difference detecting means and said reference phase difference setting means for outputting a signal corresponding to a difference between a phase difference detected by said phase difference detecting means and the reference phase difference set by said reference phase difference setting means;

frequency signal generating means connected to said difference outputting means for generating a drive frequency to be applied to the drive electrode of the ultrasonic motor, based on the signal output by said difference outputting means; and upper limit frequency control means connected to said frequency signal generating means for controlling the drive frequency generated by said frequency signal generating means so as to substantially maintain the drive frequency below a predetermined upper limit frequency which would produce a detected phase difference equal to that for a drive frequency in said normal running range.

4. A driving device according to claim 3, wherein said normal running range is slightly above a resonance frequency of the ultrasonic motor and said predetermined upper limit frequency is substantially below another resonance frequency of the ultrasonic motor.

5. A driving device according to claim 3, further comprising lower limit frequency control means connected to said frequency signal generating means for controlling the drive frequency generated by said frequency signal generating means so as to substantially maintain the drive frequency above a predetermined lower limit frequency which would produce a detected phase difference equal to that for a drive frequency in said normal running range.

6. A driving device according to claim 5, wherein said normal running range is slightly above a resonance frequency of the ultrasonic motor, said predetermined upper limit frequency is substantially below a second resonance frequency of the ultrasonic motor, and said predetermined lower limit frequency is substantially above a third resonance frequency of the ultrasonic motor.

7. An ultrasonic motor driving device comprising:

phase difference detecting means for detecting a phase difference between a voltage waveform of a drive frequency applied to a drive electrode of an ultrasonic motor and a voltage waveform indicative of a vibration state of an elastic member of the ultrasonic motor;

reference phase difference setting means for setting a reference phase difference corresponding to an optimum drive frequency within a normal running range and which makes a drive force of the ultrasonic motor largest;

difference outputting means connected to said phase difference detecting means and said reference phase difference setting means for outputting a signal corresponding to a difference between a phase difference detected by said phase difference detecting means and the reference phase difference set by said reference phase difference setting means;

start frequency setting means for setting a start drive frequency at starting of the ultrasonic motor;

frequency signal generating means for generating a drive frequency to be applied to the drive electrode of the ultrasonic motor, based on the signal output by said difference outputting means, and for generating said start drive frequency; and switching means for switchingly connecting said frequency signal generating means to drive the drive electrode at the start drive frequency set by said start frequency setting means for a predetermined time from the start of the ultrasonic motor, and then at the drive frequency based on the signal output by said difference outputting means.

8. An ultrasonic motor driving device comprising:

drive means for applying a drive frequency signal to a drive electrode of an ultrasonic motor;

drive state detecting means for a detecting a drive state of the ultrasonic motor;

control means connected to said drive state detecting means and said drive means for controlling said drive means so as to control said drive frequency signal on the basis of the drive state detected by said drive state detecting means; and time-delay means connected to said control means for inhibiting a start of said controlling of said drive means by said control means for a predetermined delay period after a start of detecting by said drive state detecting means.

9. An ultrasonic motor driving device according to claim 8, wherein said drive state detecting means detects a drive state of the ultrasonic motor by detecting a phase difference between the drive frequency signal applied to the drive electrode of the ultrasonic motor and a voltage waveform indicative of a vibration state of an elastic member of the ultrasonic motor.

10. An ultrasonic motor driving device according to claim 9, wherein said control means controls said drive means based on a difference between a reference phase difference corresponding to an optimum drive frequency which makes a drive force of the ultrasonic motor largest and the phase difference detected by said drive state detecting means.

11. A driving device in which an alternating voltage is applied to a drive electrode fixed to an elastic member of an ultrasonic motor, comprising:

detecting means for detecting a vibration state of said elastic member;

frequency changing means connected to said detecting means for changing the frequency of said alternating voltage based on the vibration state detected by said detecting means; and lower limit frequency control means connected to said frequency changing means for controlling said frequency changing means, said lower limit frequency control means detecting a condition in which the frequency of said alternating voltage has been reduced at least to a predetermined lower limit frequency which is below a normal running frequency range of the ultrasonic motor and which would result in a detected vibration state corresponding to that for a frequency within said normal running frequency range, and operating so as to substantially maintain the frequency of said alternating voltage above said predetermined lower limit frequency.

12. A driving device in which an alternating voltage is applied to a drive electrode fixed to an elastic member of an ultrasonic motor, comprising:

detecting means for detecting a vibration state of said elastic member;

frequency changing means connected to said detecting means for changing the frequency of said alternating voltage based on the vibration state detected by said detecting means; and upper limit frequency control means connected to said frequency changing means for controlling said frequency changing means, said upper limit frequency control means detecting a condition in which the frequency of said alternating voltage has been increased at least to a predetermined upper limit frequency which is above a normal running frequency range of the motor and which would result in a detected vibration state corresponding to that for a frequency within said normal running frequency range, and operating so as to substantially maintain the frequency of said alternating voltage below said predetermined upper limit frequency.

13. A driving device according to claim 12, further comprising lower limit frequency control means connected to said frequency changing means for controlling said frequency changing means so as to substantially maintain the frequency of said alternating voltage above a predetermined lower limit frequency which is below said normal running frequency range and which would result in a detected vibration state corresponding to that for a frequency within said normal running frequency range.

14. In an ultrasonic motor system comprising a phase difference detecting device which detects a phase difference between a voltage waveform of a drive frequency applied to a drive electrode of said motor and a voltage waveform indicative of a vibration state of an elastic member of said motor, a reference phase difference setting device which sets a reference phase difference that corresponds to an optimum drive frequency within a normal running range of said motor and that makes a drive force of said motor largest, a difference outputting device connected to said phase difference detecting device and said reference phase difference setting device and which outputs a signal corresponding to a difference between a phase difference detected by said phase difference detecting device and the reference phase difference and a frequency signal generating device which generates a drive frequency to be applied to the drive electrode of said motor, said frequency signal generating device being connected to said difference outputting device in order to generate a drive frequency corresponding to the difference between the detected phase difference and the reference phase difference, and generating a set start drive frequency, a method comprising the steps of:

driving said motor at the set start frequency for a predetermined time from starting said motor; and continuing the driving of said motor at the drive frequency corresponding to the difference between the detected phase difference and the reference phase difference after the predetermined time has elapsed.

15. An ultrasonic motor driving device comprising:

a phase difference detecting circuit which detects a phase difference between a voltage waveform of a drive frequency applied to a drive electrode of an ultrasonic motor and a voltage waveform indicative of a vibration state of an elastic member of the ultrasonic motor;

a reference phase difference setting circuit which sets a reference phase difference corresponding to an optimum drive frequency within a normal running range and which makes a drive force of the ultrasonic motor largest;

a difference outputting circuit connected to said phase difference detecting circuit and said reference phase difference setting circuit and which outputs a signal corresponding to a difference between a phase difference detected by said phase difference detecting circuit and the reference phase difference set by said reference phase difference setting circuit;

a frequency signal generating circuit connected to said difference outputting circuit and which generates a drive frequency to be applied to the drive electrode of the ultrasonic motor, based on the signal output by said difference outputting circuit; and a lower limit frequency control circuit connected to said frequency signal generating circuit and which controls the drive frequency generated by said frequency signal generating circuit so as to substantially maintain the drive frequency above a predetermined lower limit frequency which would produce a detected phase difference equal to that for a drive frequency in said normal running range.

16. A driving device according to claim 15, wherein said normal running range is slightly above a resonance frequency of the ultrasonic motor and said predetermined lower limit frequency is substantially above another resonance frequency of the ultrasonic motor.

17. An ultrasonic motor driving device comprising:

a phase difference detecting circuit which detects a phase difference between a voltage waveform of a drive frequency applied to a drive electrode of an ultrasonic motor and a voltage waveform indicative of a vibration state of an elastic member of the ultrasonic motor;

a reference phase difference setting circuit which sets a reference phase difference corresponding to an optimum drive frequency within a normal running range and which makes a drive force of the ultrasonic motor largest;

a difference outputting circuit connected to said phase difference detecting circuit and said reference phase difference setting circuit and which outputs a signal corresponding to a difference between a phase difference detected by said phase difference detecting circuit and the reference phase difference set by said reference phase difference setting circuit;

a frequency signal generating circuit connected to said difference outputting circuit and which generates a drive frequency to be applied to the drive electrode of the ultrasonic motor, based on the signal output by said difference outputting circuit; and an upper limit frequency control circuit connected to said frequency signal generating circuit and which controls the drive frequency generated by said frequency signal generating circuit so as to substantially maintain the drive frequency below a predetermined upper limit frequency which would produce a detected phase difference equal to that for a drive frequency in said normal running range.

18. A driving device according to claim 17, wherein said normal running range is slightly above a resonance frequency of the ultrasonic motor and said predetermined upper limit frequency is substantially below another resonance frequency of the ultrasonic motor.

19. A driving device according to claim 17, further comprising a lower limit frequency control circuit connected to said frequency signal generating circuit and which controls the drive frequency generated by said frequency signal generating circuit so as to substantially maintain the drive frequency above a predetermined lower limit frequency which would produce a detected phase difference equal to that for a drive frequency in said normal running range.

20. A driving device according to claim 19, wherein said normal running range is slightly above a resonance frequency of the ultrasonic motor, said predetermined upper limit frequency is substantially below a second resonance frequency of the ultrasonic motor, and said predetermined lower limit frequency is substantially above a third resonance frequency of the ultrasonic motor.

* * * * *